(12) United States Patent
Esteghlal et al.

(10) Patent No.: US 6,260,411 B1
(45) Date of Patent: Jul. 17, 2001

(54) METHOD OF SUPPRESSING ERRONEOUS ANNOUNCEMENTS IN ON-BOARD DIAGNOSTIC EQUIPMENT OF A MOTOR VEHICLE RESULTING FROM A DEFICIENCY OF FUEL

(75) Inventors: Gholamabas Esteghlal, Ludwigsburg; Wilhelm Sorg, Markgröningen; Georg Mallebrein, Korntal-Münchingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/114,492

(22) Filed: Jul. 13, 1998

(30) Foreign Application Priority Data

Jul. 11, 1997 (DE) .............................................. 197 29 695

(51) Int. Cl.$^7$ ............................ G01L 3/26; G01M 15/00; G01M 19/00

(52) U.S. Cl. ........................... 73/118.1; 73/116; 73/117.3

(58) Field of Search ................................... 73/117.3, 116, 73/118.1, 119 A

(56) References Cited

U.S. PATENT DOCUMENTS

| 5,158,059 | 10/1992 | Kuroda . | |
|---|---|---|---|
| 5,275,144 | * 1/1994 | Gross . | |
| 5,723,780 | * 3/1998 | Miwa et al. | ........................ 73/119 A |

* cited by examiner

Primary Examiner—Benjamin R. Fuller
Assistant Examiner—Octavia Davis
(74) Attorney, Agent, or Firm—Walter Ottesen

(57) ABSTRACT

The invention is directed to an on-board diagnostic method wherein a fault is detected but is only registered as a fault when a delay time span has elapsed since its first-time occurrence in an operating phase of an internal combustion engine and when the fault then still continues to occur. The delay time span is measured on the consumption of the quantity of fuel which the vehicle can still consume for an almost empty tank. In this way, detected faults, which are attributable to an empty tank, are not registered.

6 Claims, 3 Drawing Sheets

METHOD OF SUPPRESSING ERRONEOUS ANNOUNCEMENTS IN ON-BOARD DIAGNOSTIC EQUIPMENT OF A MOTOR VEHICLE RESULTING FROM A DEFICIENCY OF FUEL

FIELD OF THE INVENTION

The invention relates to a method for suppressing the influence of an empty fuel tank on the on-board-diagnosis for a motor vehicle driven by an internal combustion engine.

BACKGROUND OF THE INVENTION

Statutory regulations require that all exhaust-gas relevant components of a motor vehicle be diagnosed. Faults which lead to the exhaust-gas limit value to be exceeded by a factor of 1.5 must be detected in running operation of the vehicle and, for example, indicated by switching on a fault lamp. When the diagnostic lamp illuminates, the driver is instructed to immediately go to a service facility and have the fault corrected. An unnecessary visit to the service facility as a consequence of an erroneously illuminated fault lamp is to be avoided.

The statutes permit diagnostic functions to be switched off or permit a delayed entry of a fault when the environmental conditions make an erroneous fault detection probable, for example, when the air pressure is too low at high elevations.

U.S. Pat. No. 5,158,059 discloses a method in this context wherein the detection or registration of faults is suppressed when the tank is empty. This measure is supported by the possibility that, for an almost empty tank, fuel as well as air reaches the fuel supply of the engine. As a consequence, the precision of the fuel metering deteriorates. Considerable mixture leaning takes place which, in turn, can lead to a significant enrichment reaction in a closed air/fuel ratio control loop. The mixture deviations, especially the leaning of the fuel mixture, can cause combustion misfires. Depending upon the construction of the fuel tank, several kilometers can still be travelled from the first occurrence of the leaning of the fuel mixture until the vehicle comes to final standstill. This effect affects a series of diagnostic functions which react with fault announcements. These fault announcements do not result from a defective component. For this reason, the fault announcements should not lead to driving the fault lamp. The diagnostic functions which are affected are, for example, the detection of combustion misfires, the diagnosis of the fuel supply system, the diagnosis of the $\lambda$-control by means of a $\lambda$-probe rearward of the catalytic converter, the diagnosis of the catalytic converter and the diagnosis of the $\lambda$-probe.

SUMMARY OF THE INVENTION

In view of the above, it is an object of the invention to provide a method for evaluating fault announcements of on-board diagnostic functions in combination with the fill level of the fuel tank so that fault announcements, which result because of a deficiency of fuel, are not registered while, on the other hand, ensuring that proper faults, which do not result from a deficiency of fuel, are detected even when the fuel tank level is low.

The method of the invention is for diagnosing an internal combustion engine wherein a fault is detected and registered under specific conditions. The engine is supplied with fuel from a fuel tank and the method includes the steps of: determining the fill level of fuel in the fuel tank; and, when the fill level is below a lower threshold value, registering a fault only when a delay time span has elapsed since a first-time occurrence in an operating phase of the engine and when the fault still continues to occur.

The invention is based on the fact that a fault announcement, which is caused by a defect, occurs over a longer time interval than does an error caused by a deficiency of fuel. Only a limited quantity of fuel can be inducted from the first occurrence of the effects of a tank driven to empty until the engine finally comes to standstill because of a lack of fuel. The distance travelled by a motor vehicle with an empty tank is, as a rule, shorter than the distance which corresponds to the exhaust-gas test Federal Test Procedure 75 (FTP75). An essential feature of the invention is that the fault announcement is delayed for that time span in which the vehicle can be driven with an almost empty tank without retanking.

Advantageously, the delay time span is coupled to the consumption of a specific minimum quantity of fuel. A measure for this quantity can be formed from the data available in the control apparatus, such as the load signal or the injection times. Alternatively, a fixed delay time can be pregiven. The delay time can also be variable in dependence upon operating parameters such as by decrementing a pregiven value. The counter count increment increases with increasing load and/or rpm. If faults still occur after this time span, then they are not caused by a temporary deficiency of fuel; instead, they are caused by a defect and will then be registered as faults.

In the above way, an unwanted driving of the fault lamp when there is a deficiency of fuel because of an empty tank is advantageously prevented.

It is also advantageous that a proper fault is indicated in any event. Even when an empty tank is indicated continuously because of a defective level indicator or the driver drives almost exclusively with only a very low level of fuel, driving the fault lamp is not prevented for a valid fault. It has been shown that, when carrying out the method of the invention, a vehicle in the exhaust-gas test at the authority responsible for such tests does not perform significantly differently than without this fault suppression for an empty tank.

It is likewise advantageous to detect retanking and to consider the retanking because retanking changes the preconditions for the fault registration.

According to the method of the invention, only a delay occurs of the entering of a fault when a defective fuel tank level transducer is present which erroneously indicates an empty tank. However, it is ensured that after a renewed conditioning of the vehicle for a FTP75 test and the execution of this test, a proper fault is detected.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
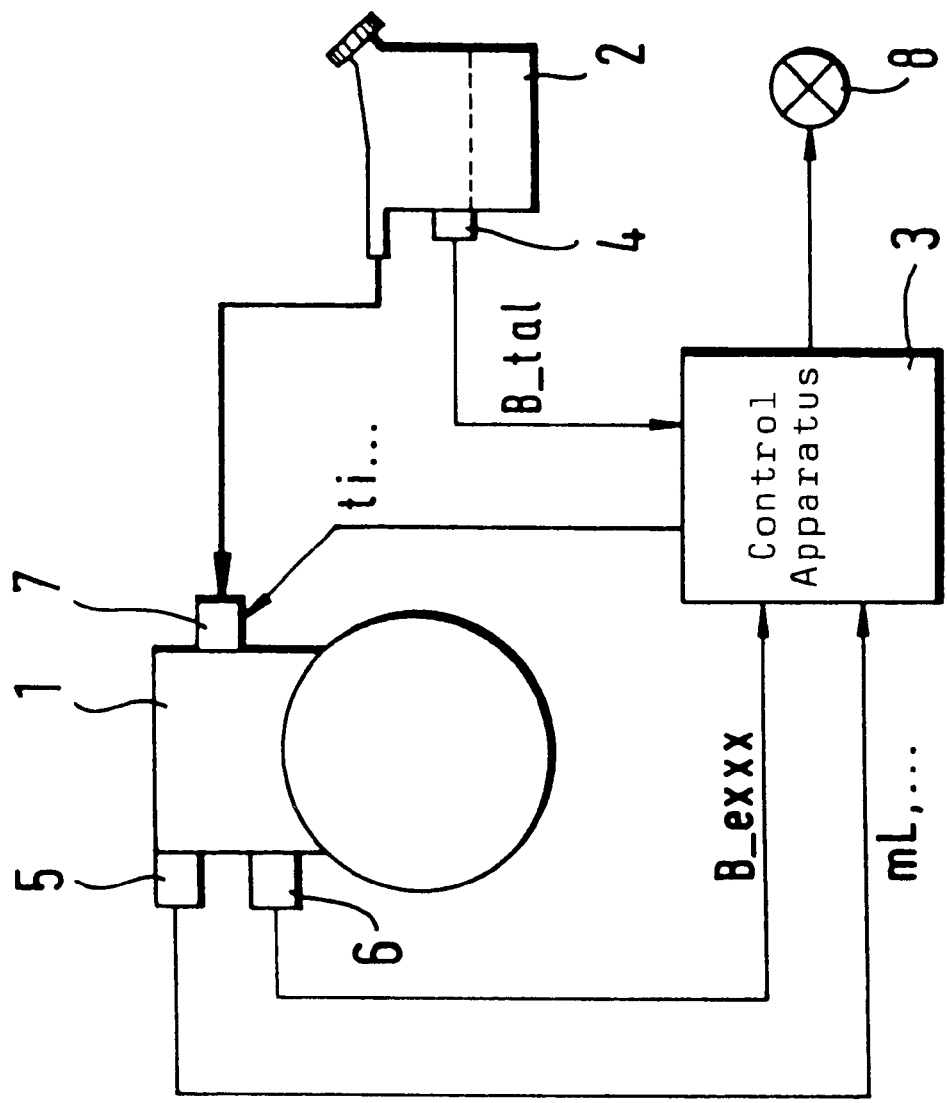
FIG. 1 shows the technical background in which the method of the invention is applied.

In FIG. 1, reference numeral 1 identifies an internal combustion engine which is supplied with fuel from a tank 2. A control apparatus 3 receives the signal B_tal (condition that tank is empty) as to the state of the fill level from a tank fill level sensor 4, signals as to operating parameters of the engine such as inducted air quantity mL, rpm, et cetera from sensor means 5 and, if required, signals B_exxx as to the occurrence of exhaust-gas relevant faults when operating the engine from diagnostic sensor means 6. The control apparatus 3 forms control commands from these signals for controlling engine functions such as injection and ignition. This is expressed in FIG. 1 with an injection pulse width ti for driving an injection valve arrangement 7. Furthermore, the control apparatus processes especially the signals B_exxx together with additional signals to provide a display or for storage of the exhaust-gas relevant fault conditions. The signal B_exxx represents the detected faults and the additional signals include the signal B_tal as to the tank level. This function is symbolized in FIG. 1 by a fault lamp 8 which can be switched on by the control apparatus 3 in order to inform the driver as to the occurrence of faults.

Figure 2:
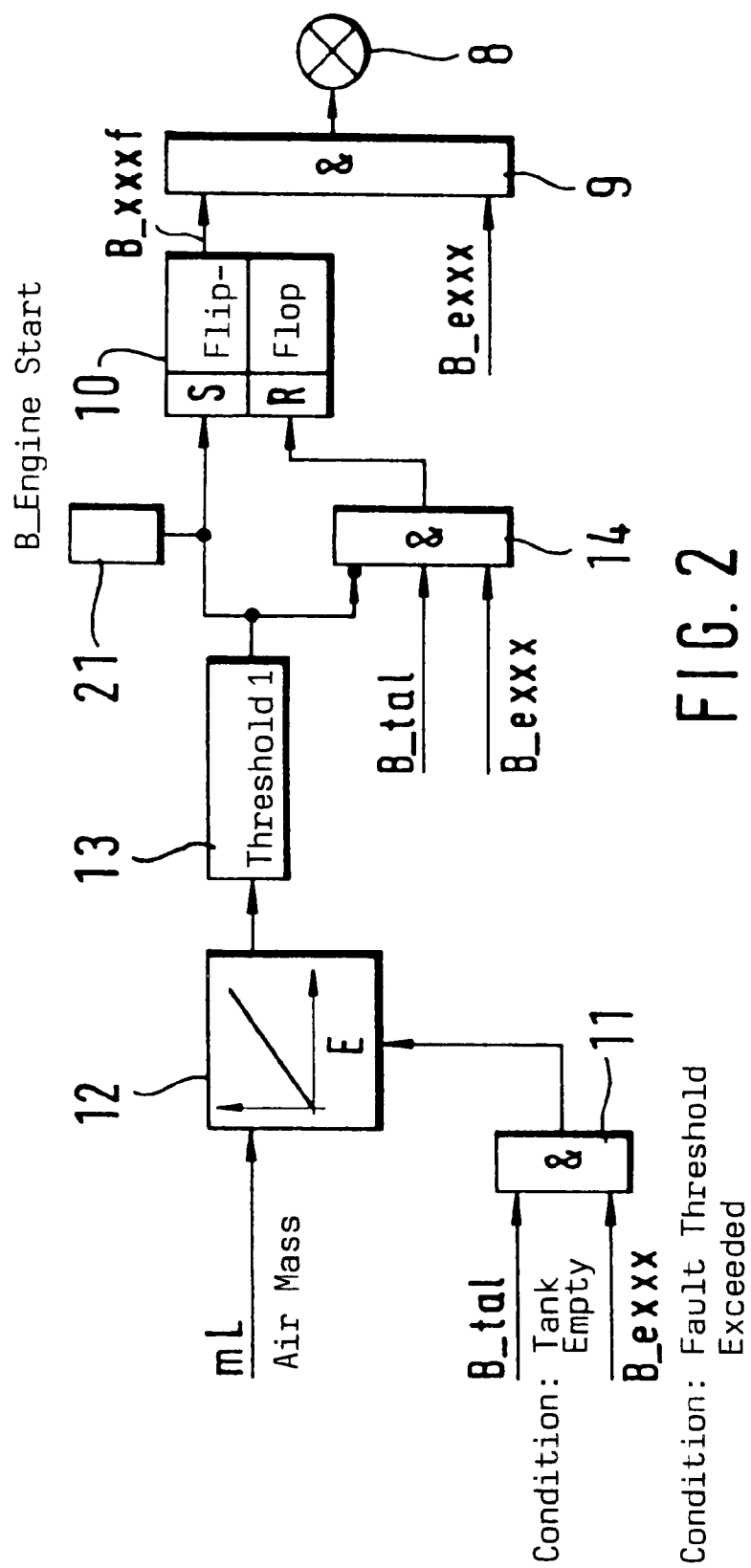
FIG. 2 shows an embodiment of the method of the invention in the form of function blocks; and, FIG. 3 represents a further embodiment of the method of the invention with functions which advantageously supplement the embodiment of FIG. 2.

FIG. 2 shows the delay of the display of faults which occur with a fuel tank level signalized as being low. For this purpose and in addition to the fault lamp 8, the structure of FIG. 2 includes an AND-element 9 to which, as input signals, the following are supplied, namely, fault announcements B_exxx from one or several diagnostic functions as well as, if required, a fault enabling bit B_xxxf. The fault lamp 8 is correspondingly driven only when fault signals B_exxx and fault enable signal B_xxxf are present or both signals have the level 1. The absence of faults or the non-presence of a fault enabling signal is defined in this example by a level 0. The delay of the registration of a fault announcement B_exxx in accordance with the invention is defined in this embodiment in that the fault lamp 8 is only driven when the fault enabling signal B_xxxf is present at the same time.

First, after the engine start, a setting (level=1) of the fault enabling bit B_xxxf is set by enabling device 21. If faults B_exxx then occur, the AND-condition of block 8 is satisfied and the faults can, for example, be displayed by driving the fault lamp 8. However, if the faults B_exxx occur for an almost empty tank, then the fault enabling bit is first withdrawn by resetting the flip/flop 10 (level=0). The resetting takes place in dependence upon block 14, that is, with the simultaneous presence of fault signal B_exxx, empty tank signal B_tal and the inverted output signal of block 13. The function of this block is explained hereinafter.

With a first occurrence of faults B_exxx in combination with an empty tank signal, the threshold 1 in block 13 is in any event still not exceeded. It therefore corresponds to a logic 0 or, inverted, a logic 1. What is essential at this point is that the fault enabling bit B_xxxf is withdrawn for a first-time occurrence of faults B_exxx in combination with an empty tank. Faults, which occur in combination with an empty tank, are therefore at first not registered by the fault lamp 8 as a consequence of the withdrawal of the fault enabling bit. An essential feature of the invention is that the fault registration for an empty tank is not permanently prevented but only delayed until an empty tank has become improbable as a fault cause. According to the invention, the fault registration is again enabled after a certain delay.

In the following, the example of forming a fault enabling signal in accordance with FIG. 2 is explained. When at a specific time point in the operation of the engine, fault signals B_exxx occur for the first time and, simultaneously, the signal B_tal signalizes an empty tank, then the occurring faults could be caused by a lack of fuel.

In this case, the AND-element 11 initiates a computation in block 12 of the fuel quantity supplied to the engine starting at this time point. The fuel quantity is metered proportionally to the quantity of the inducted air. For this reason, the signal ml as to the inducted air mass can be used. The signal ml is usually present in the control apparatus.

As an alternative, the injection pulse width ti can be summed. The fuel quantity computed in block 12, which the engine has consumed since the first-time occurrence of faults B_exxx for a simultaneous presence of an empty tank signal, is compared in block 13 to a threshold value. This threshold value lies above that residual fuel quantity in a tank at which fault functions caused by a deficiency in fuel are to be assumed. For conventional motor vehicle tanks, this quantity, as a rule, amounts to several hundred ml. Exceeding this threshold in block 13 by the fuel consumption summed up in block 12 therefore means that the fault signals B_exxx, which occur for the first time when an empty tank signal B_tal is present, are not attributable to a deficiency of fuel; instead, real defects or faulty operations are the cause.

When the threshold value is exceeded, then the setting of the fault enabling bit B_xxxf is triggered in block 10 which is transferred to AND-condition block 9 for example as logic 1. Fault signals B_exxx as to detected faults, which are present from the time point of setting the fault enabling bit B_xxxf at block 9, are then registered in accordance with the invention. However, as long as the threshold in block 13 has not yet been exceeded, a fuel deficiency cannot be precluded as a cause of fault. This comparison result is supplied in an inverted form to a block 14. The block 14 symbolizes a further AND condition. As long as fault signals B_exxx and the empty tank signal B_tal and a signal indicating that a threshold has not been exceeded are all applied to block 14, the block 14 sets the fault enabling bit B_xxxf to the value 0 in block 10. Stated otherwise, as long as it is not precluded that detected faults can be attributed to a deficiency of fuel, the fault enabling bit is not set and detected faults B_exxx are still not registered in accordance with the invention.

Figure 3:
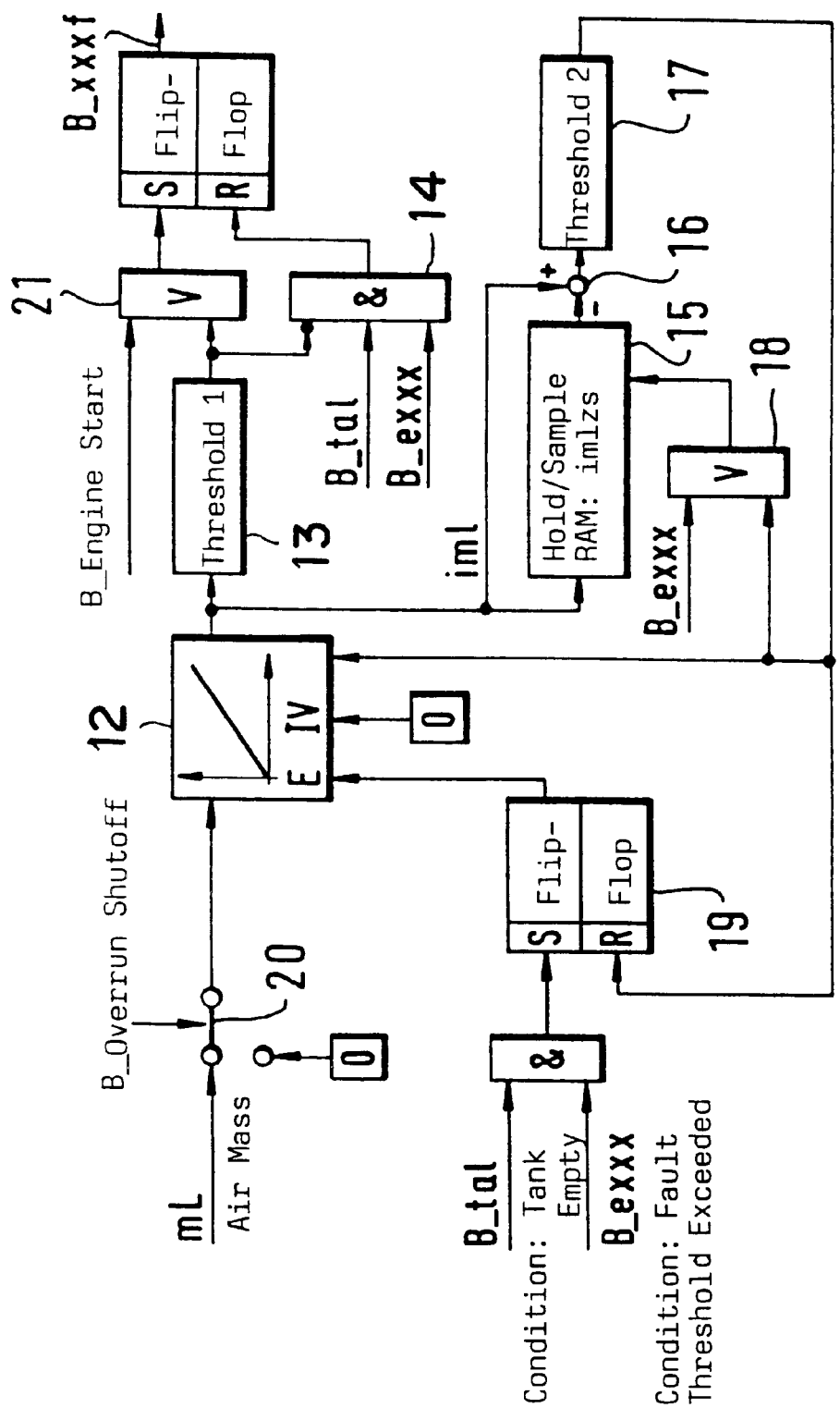

FIG. 3 shows further functions which supplement the embodiment of FIG. 2 in an advantageous manner. Thus, FIG. 3 provides, for example, a switch 20 with which the computation of the consumed fuel quantity can be interrupted. This is effected by switching over the switch 20 to the value 0 when the engine is in overrun operation with fuel metering cut off. A cutoff of the fuel metering can be triggered by the closure of the throttle flap or a drop below a lower threshold value for the injection time ti.

A special advantage is the consideration of retanking because retanking of fuel changes the precondition for the fault registration. Advantageously, a retank recognition and consideration takes place via the interrelationship of the function blocks 15 to 20 in FIG. 3. Block 15 represents a sample/hold function such as a RAM cell whose content is continuously made current, for example, with the occurrence of fault signal B_exxx. The RAM cell stores the output signal of block 12, that is, the measure for the fuel quantity which is consumed since the occurrence of the fault signal B_exxx. The storage is triggered by the output of block 19, as long as, for example, B_exxx occurs. The signal B_exxx vanishes when at least so much fuel is retanked that no error, which is caused by a deficiency of fuel, occurs. This has the consequence that the content of the RAM cell 15 is no longer renewed. In logic summing element 16, the formation of the difference of the actually consumed fuel quantity and the value stored in the RAM cell 15 takes place. If this difference exceeds a threshold 2 in block 17, this means that a certain driving path has been without the occurrence of faults as it would be expected for a retanking.

As a consequence, block 17 triggers a reset of the integrator 12 to the value 0, a storage of this value 0 via block 18 in the RAM cell 15 and a reset of the flip/flop 19. The resetting of the flip/flop 19 causes the condition that the integrator 12 only then sums the air mass and fuel mass again when the condition of the block 11 occurs, that is, when again a fault signal B_exxx occurs with the simultaneous occurrence of an empty tank signal.

It is understood that the foregoing description is that of the preferred embodiments of the invention and that various changes and modifications may be made thereto without departing from the spirit and scope of the invention as defined in the appended claims.

What is claimed is:

1. A method for diagnosing an internal combustion engine wherein a fault other than one resulting from a deficiency of fuel is detected and registered under specific conditions, the engine being supplied with fuel from a fuel tank, the fuel having a fill level in said fuel tank, the method comprising the steps of:

determining the fill level of fuel in said fuel tank; and, when said fill level is below a lower threshold value, registering said fault only when:

(a) a delay time span has elapsed since a first-time occurrence of said fault in an operating phase of said engine; and, (b) when said fault still continues to occur after the elapse of said delay time span.

2. The method of claim 1, comprising the further step of determining said delay time span by a consumption of a specific minimum quantity of fuel.

3. The method of claim 2, wherein an air mass inducted by said engine is detected and represented by an air mass signal; and, wherein the method comprises the further step of determining the specific quantity of fuel by integrating said signal.

4. The method of claim 2, comprising the further step of determining the consumed fuel quantity by summing fuel metering signals (injection pulsewidths).

5. The method of claim 1, comprising the further step of interrupting a determination of the specific quantity of fuel after a tanking operation.

6. The method of claim 5, comprising the further step of then interrupting the determination of the specific quantity of fuel when the fault signal does not occur and when a specific additional minimum quantity of fuel is consumed while said fault signal continues to not occur.

* * * * *